United States Patent
Goto et al.

(10) Patent No.: US 7,758,991 B2
(45) Date of Patent: Jul. 20, 2010

(54) FUEL CELL

(75) Inventors: Shuhei Goto, Utsunomiya (JP); Kazuo Nunokawa, Utsunomiya (JP); Takahiro Takeshita, Utsunomiya (JP); Ken Takahashi, Shimotsuga-gun (JP); Narutoshi Sugita, Utsunomiya (JP); Hiroyuki Tanaka, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/978,843

(22) Filed: Oct. 30, 2007

(65) Prior Publication Data

US 2008/0113255 A1      May 15, 2008

(30) Foreign Application Priority Data

Nov. 9, 2006   (JP) .............................. 2006-304157
Jun. 22, 2007  (JP) .............................. 2007-165178

(51) Int. Cl.
  *H01M 8/04*   (2006.01)
  *H01M 2/14*   (2006.01)
(52) U.S. Cl. .............................. 429/39; 429/38; 429/34; 429/35; 429/36
(58) Field of Classification Search ................... 429/39, 429/38, 34, 35, 36
    See application file for complete search history.

(56) References Cited

U.S. PATENT DOCUMENTS

2007/0184327 A1 * 8/2007 Ishioka et al. .................. 429/35
2008/0081242 A1 * 4/2008 Sasaki et al. ................... 429/38

FOREIGN PATENT DOCUMENTS

| JP | 08-222237 | * | 8/1996 |
| JP | 2001-266911 | | 9/2001 |

* cited by examiner

*Primary Examiner*—Dah-Wei Yuan
*Assistant Examiner*—Angela J. Martin
(74) *Attorney, Agent, or Firm*—Lahive & Cockfield, LLP; Anthony A. Laurentano (57) ABSTRACT

A coolant flow field is formed on a surface of a second metal separator. Further, a rubber bridge dividing the coolant flow field and a coolant supply passage is formed on the surface. The rubber bridge includes a plurality of channels connecting the coolant flow field and the coolant supply passage, a plurality of grooves between the channels, and a partition closing the grooves to prevent the flow of a coolant in the respective grooves.

7 Claims, 14 Drawing Sheets

FUEL CELL

BACKGROUND OF THE INVENTION

1. Field of the Invention

The present invention relates to a fuel cell formed by stacking an electrolyte electrode assembly and a metal separator in a stacking direction. The electrolyte electrode assembly includes a pair of electrodes and an electrolyte interposed between the electrodes. A fluid passage extends through the fuel cell in a stacking direction for supplying a fluid comprising at least one of a fuel gas, an oxygen-containing gas, and a coolant in the stacking direction.

2. Description of the Related Art

For example, a polymer electrolyte fuel cell employs a power generation cell formed by sandwiching a membrane electrode assembly (MEA) between separators. The membrane electrode assembly includes an anode, a cathode, and an electrolyte membrane interposed between the anode and the cathode. In use, normally, a predetermined number of power generation cells are stacked together to form a fuel cell stack.

In the fuel cell, a fuel gas flow field (fluid flow field) for supplying a fuel gas (fluid) and an oxygen-containing gas flow field (fluid flow field) for supplying an oxygen-containing gas (fluid) are formed in surfaces of separators facing a cathode and an anode, respectively. Further, a fuel gas supply passage and a fuel gas discharge passage as fluid passages connected to a fuel gas flow field and an oxygen-containing gas supply passage and an oxygen-containing gas discharge passage as fluid passages connected an oxygen-containing gas flow field extend through marginal portions of the separators in the stacking direction.

Further, a coolant flow field (fluid flow field) for cooling the membrane electrode assembly is formed between the separators. A coolant supply passage and a coolant discharge passage as (fluid passages) connected to the coolant flow field extend through the separators in the stacking direction.

In the structure, the fluid flow field and the fluid passage are connected by connection channels such as parallel grooves for supplying the fluid smoothly and uniformly. However, at the time of tightening the separator and the electrolyte electrode assembly, and a seal member between the separator and the electrolyte electrode assembly, the seal member enters the connection channels undesirably. Thus, the desired sealing performance cannot be maintained, and the reactant gas does not flow smoothly.

Figure 14:
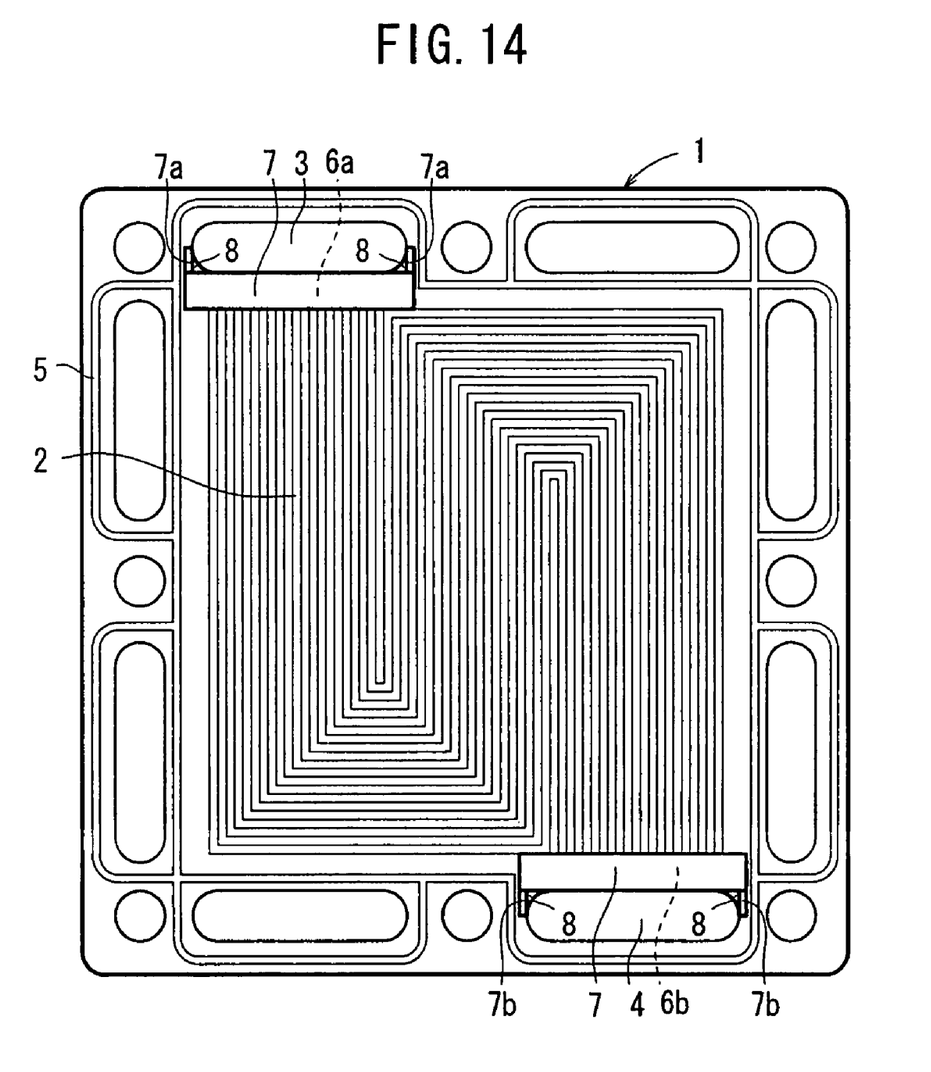
FIG. 14 is a front view showing a separator of a conventional fuel cell stack.

In this regard, in a polymer electrolyte fuel cell stack disclosed in Japanese Laid-Open Patent Publication No. 2001-266911, as shown in FIG. 14, a reactant gas flow field comprising grooves in a serpentine pattern, e.g., an oxygen-containing gas flow field 2 is formed in a surface of a separator 1. The oxygen-containing gas flow field 2 is connected to an oxygen-containing gas supply passage 3 and an oxygen-containing gas discharge passage 4. The oxygen-containing gas supply passage 3 and the oxygen-containing gas discharge passage 4 extend through marginal portions of the separator in a stacking direction. Packings 5 are provided in the separator 1. The packings 5 seal the passages 3, 4 from other passages, while allowing the passages 3, 4 to be connected to the oxygen-containing gas flow field 2.

SUS plates (stainless steel) 7 as seal members are provided in connection channels 6a, 6b connecting the passage 3, 4 and the oxygen-containing gas flow field 2. Each of the SUS plates 7 has a rectangular shape having two ears 7a, 7b at two positions. The ears 7a, 7b are fitted to steps 8 formed in the separator 1. Therefore, in the conventional technique, the SUS plate 7 covering the connection channels 6a, 6b prevents the polymer membrane (not shown) and the packing 5 from being stuck in the grooves of the oxygen-containing gas flow field 2, making it possible to ensure sealability and prevent increase in the pressure loss of the reactant gas.

However, in the conventional technique, the SUS plates 7 are attached to connection channels 6a, 6b of the separator 1, respectively. Thus, operation of attaching the SUS plates 7 is laborious. In particular, in the case where several tens to several hundreds of fuel cells are stacked together, the process of attaching the SUS plates 7 is considerably complicated, and time consuming. Thus, the cost of fabricating the fuel cells is significantly high.

SUMMARY OF THE INVENTION

A main object of the present invention is to provide a fuel cell which makes it possible to effectively simplify the process of assembling the fuel cell, and the desired sealing function is achieved with simple and economical structure.

The present invention relates to a fuel cell formed by stacking an electrolyte electrode assembly and a metal separator in a stacking direction. The electrolyte electrode assembly includes a pair of electrodes, and an electrolyte interposed between the electrodes. A fluid flow field for supplying a fluid comprising at least one of a fuel gas, an oxygen-containing gas, and a coolant along a surface of the metal separator and a fluid passage for supplying the fluid in the stacking direction are formed in the fuel cell.

A rubber wall member is provided on the metal separator for dividing the fluid flow field and the fluid passage. The rubber wall member has a channel connecting the fluid flow field and the fluid passage, a groove formed by a cutout in the stacking direction, and a partition closing at least part of the groove to prevent flow of the fluid.

According to the present invention, the rubber wall member dividing the fluid flow field and the fluid passage has a relatively large size. By forming the groove in the rubber wall member, it is possible to increase the elasticity of the rubber wall member itself. It is because the compression load characteristic of the rubber wall member is lowered. The metal separator contacts the adjacent components tightly in the stacking direction, and the desired sealing performance is achieved.

Further, the partition for closing at least part of the groove to prevent the flow of the fluid is provided. Thus, the fluid only flows through the channel. In the structure, it is possible to supply the desired amount of fluid reliably, and the desired power generation performance and cooling performance can be obtained.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
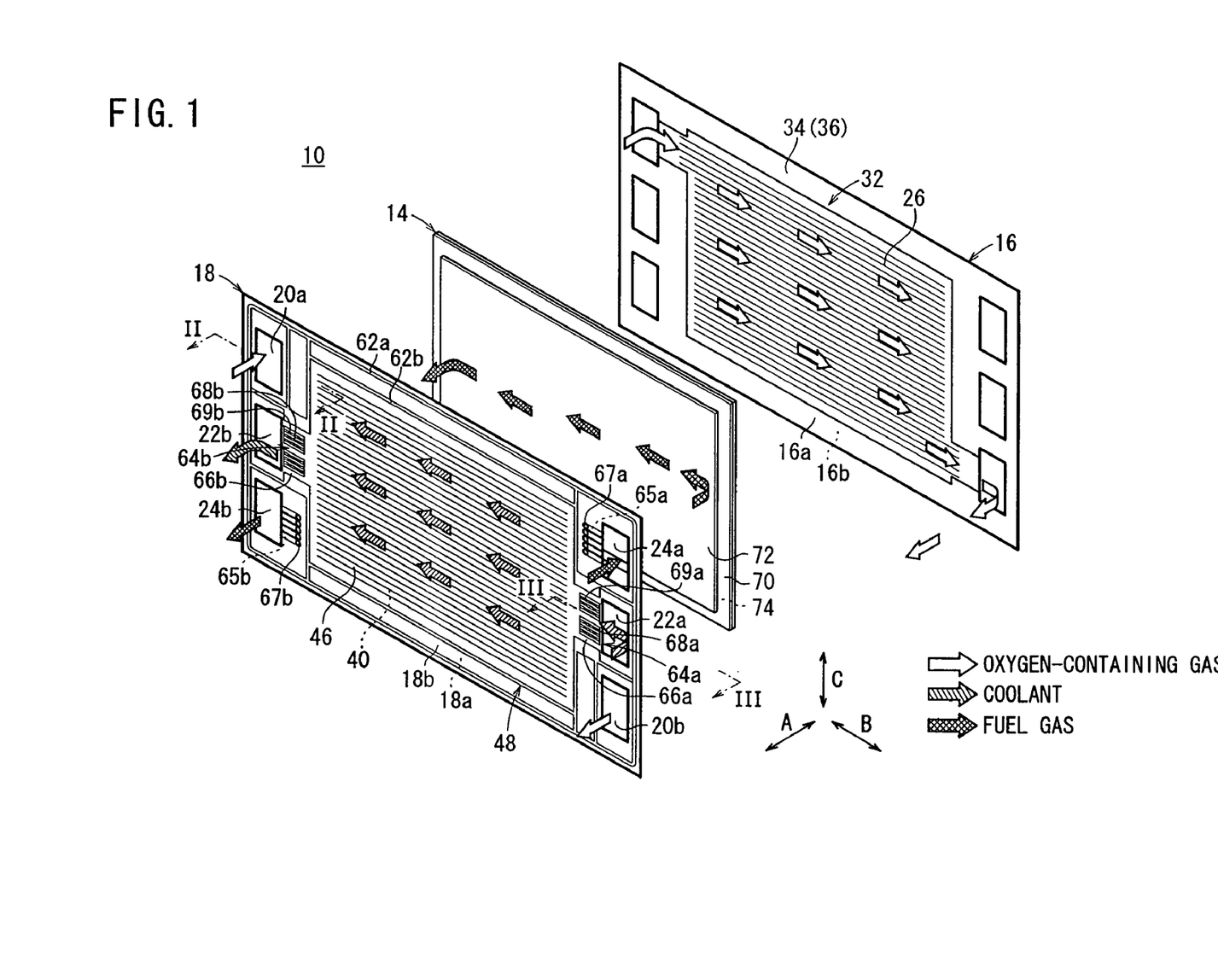
FIG. 1 is an exploded perspective view showing main components of a fuel cell according to a first embodiment of the present invention.
Figure 2:
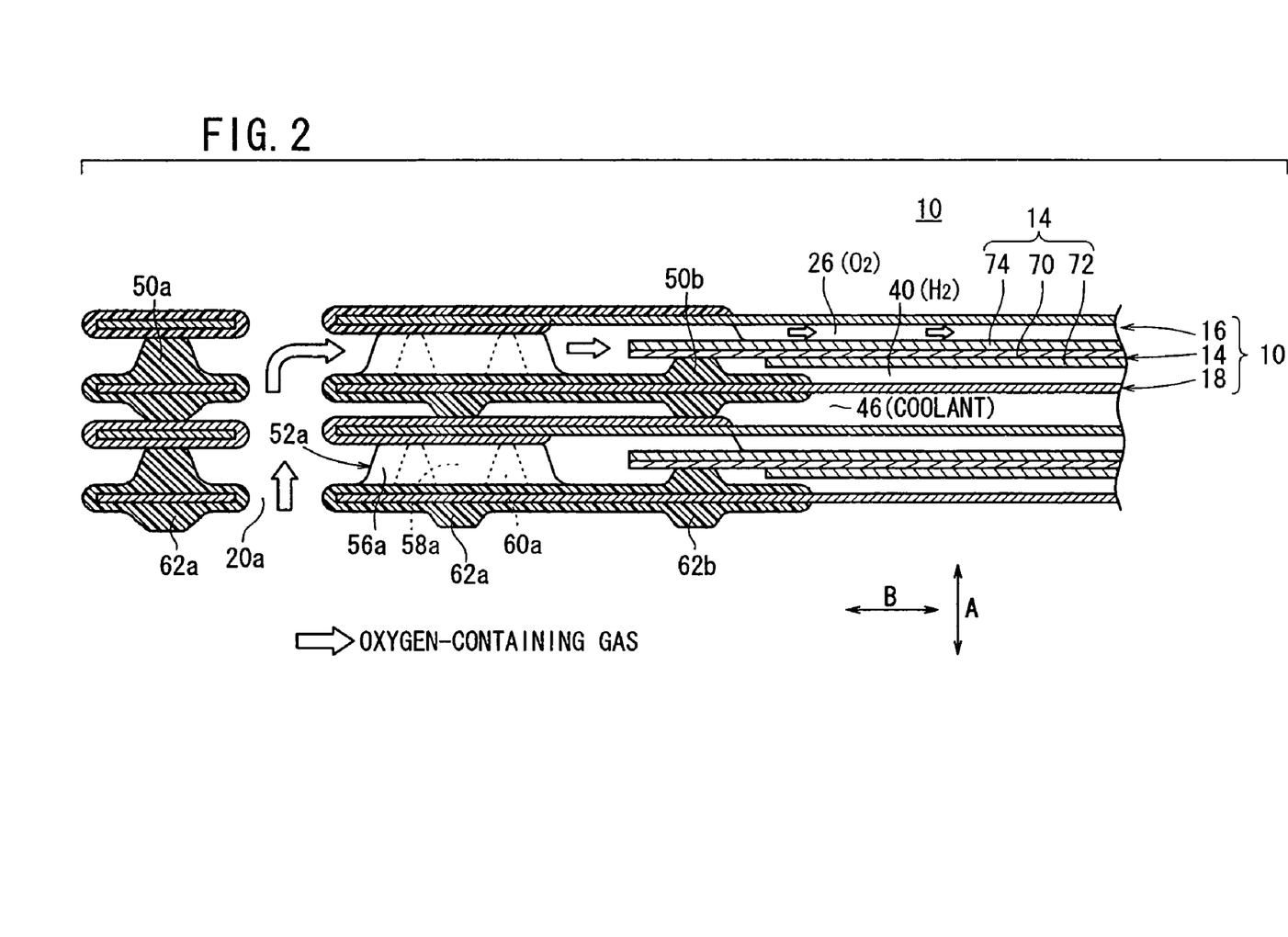
FIG. 2 is a cross sectional view showing a fuel cell stack formed by stacking a plurality of the fuel cells, taken along a line II-II in FIG. 1.
Figure 3:
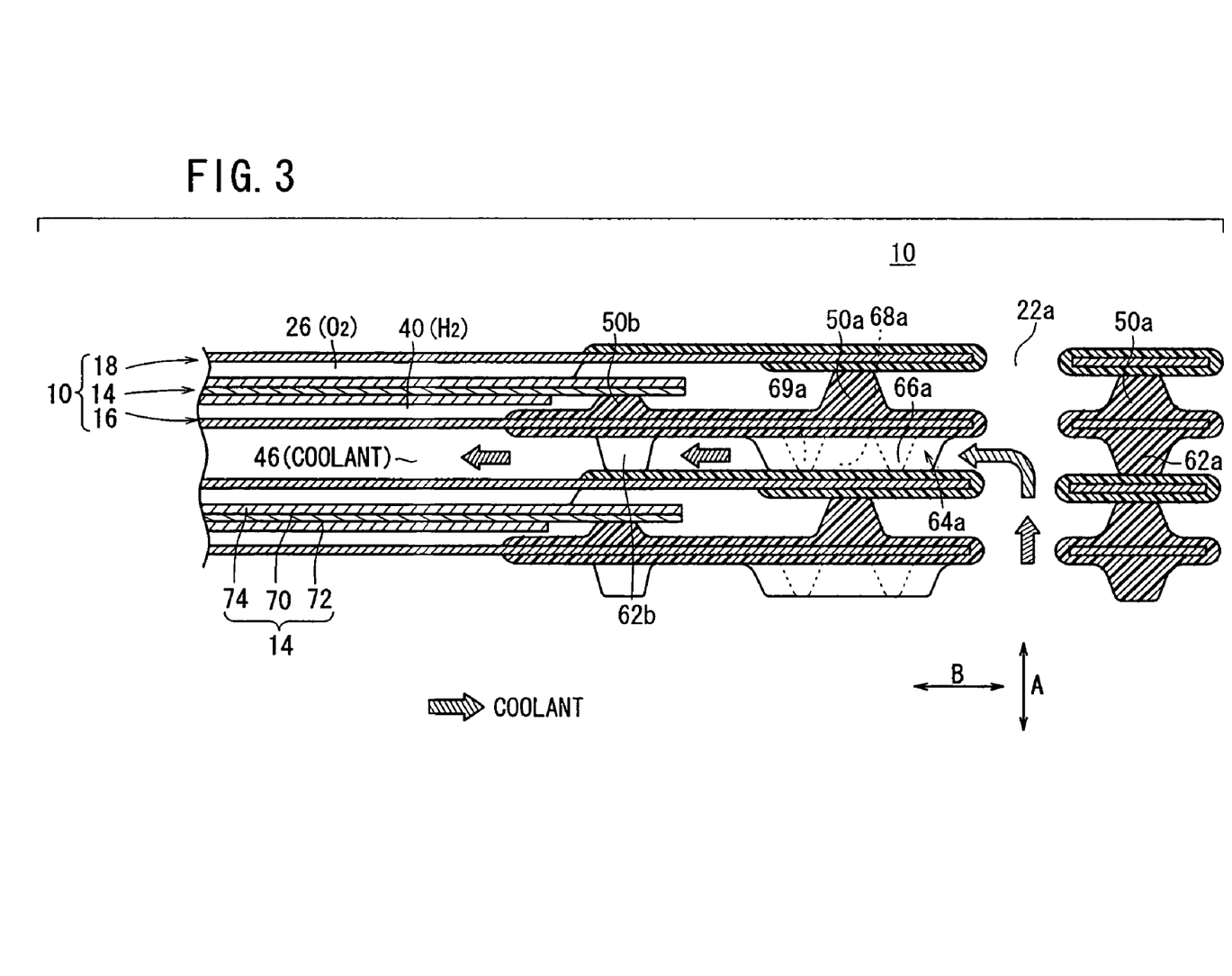
FIG. 3 is a cross sectional view showing the fuel cell stack, taken along a line III-III in FIG. 1.

FIG. 1 is an exploded perspective view showing main components of a fuel cell 10 according to a first embodiment of the present invention. FIG. 2 is a cross sectional view showing a fuel cell stack 12 formed by stacking a plurality of the fuel cells 10, taken along a line II-II in FIG. 1. FIG. 3 is a cross sectional view showing the fuel cell stack 12, taken along a line III-III in FIG. 1.

As shown in FIG. 1, each of the fuel cells 10 includes a membrane electrode assembly (electrolyte electrode assembly) 14 and a first metal separator 16 and a second metal separator 18 sandwiching the membrane electrode assembly 14. For example, the first metal separator 16 and the second metal separator 18 are steel plates, stainless steel plates, aluminum plates, or plated steel plates.

At one end of the fuel cell 10 in a horizontal direction indicated by an arrow B, an oxygen-containing gas supply passage 20a for supplying an oxidant gas such as an oxygen-containing gas, a coolant discharge passage 22b for discharging a coolant, and a fuel gas discharge passage 24b for discharging a fuel gas such as a hydrogen-containing gas are arranged vertically in a direction indicated by an arrow C. The oxygen-containing gas supply passage 20a, the coolant discharge passage 22b, and the fuel gas discharge passage 24b extend through the fuel cell 10 in a stacking direction indicated by the arrow A.

At the other end of the fuel cell 10 in the direction indicated by the arrow B, a fuel gas supply passage 24a for supplying the fuel gas, a coolant supply passage 22a for supplying the coolant, and an oxygen-containing gas discharge passage 20b for discharging the oxygen-containing gas are arranged vertically in the direction indicated by the arrow C. The fuel gas supply passage 24a, the coolant supply passage 22a, and the oxygen-containing gas discharge passage 20b extend through the fuel cell 10 in the direction indicated by the arrow A. The oxygen-containing gas supply passage 20a, the oxygen-containing gas discharge passage 20b, the coolant supply passage 22a, the coolant discharge passage 22b, the fuel gas supply passage 24a, and the fuel gas discharge passage 24b are fluid passages.

Figure 4:
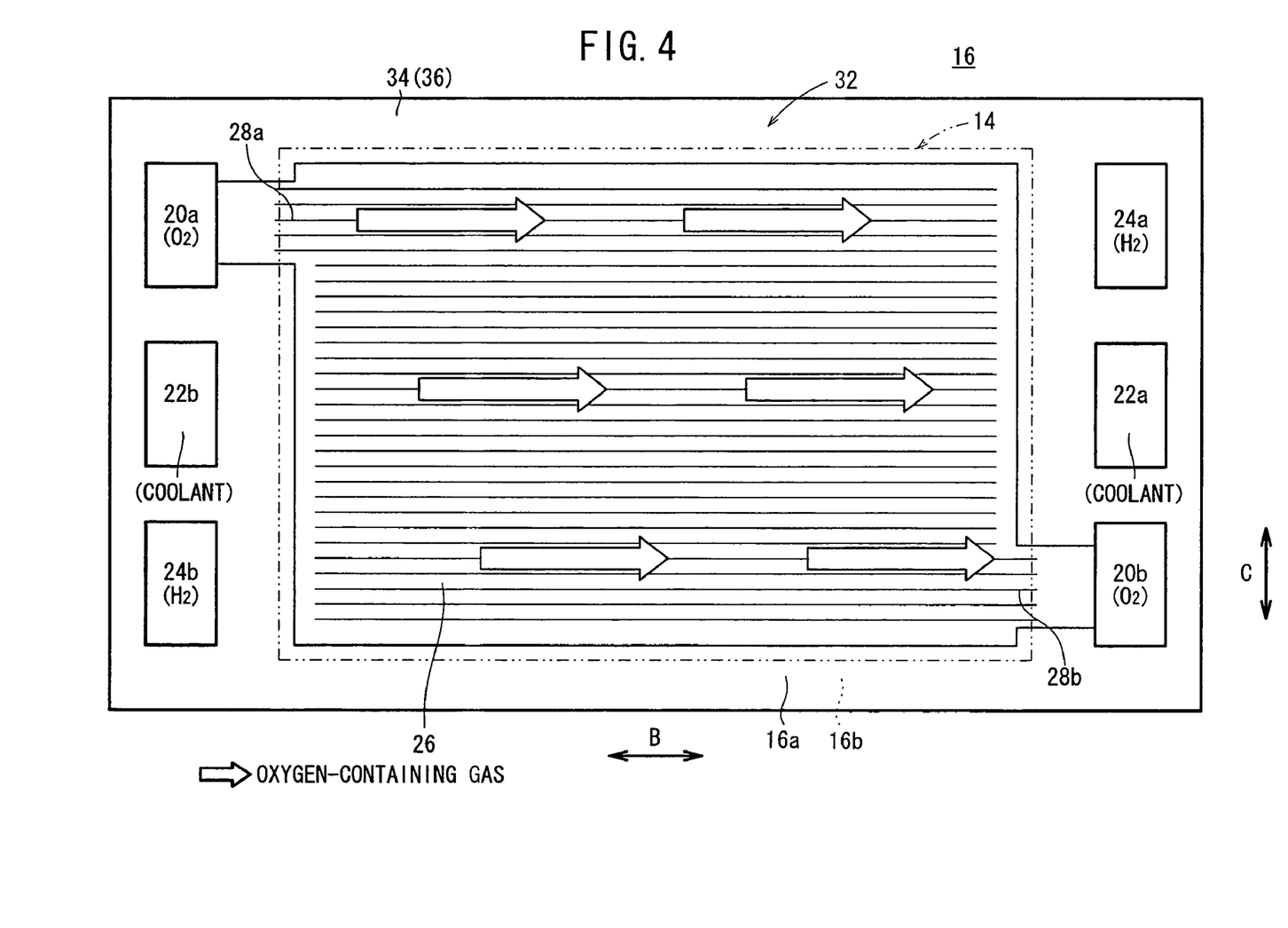
FIG. 4 is a front view showing a first metal separator of the fuel cell.

As shown in FIGS. 1 and 4, the first metal separator 16 has an oxygen-containing gas flow field (fluid flow field) 26 on a surface 16a facing the membrane electrode assembly 14. For example, the oxygen-containing gas flow field 26 extends in the direction indicated by the arrow B. The oxygen-containing gas flow field 26 comprises a plurality of grooves formed by corrugating the first metal separator 16. The oxygen-containing gas flow field 26 is connected to the oxygen-containing gas supply passage 20a and the oxygen-containing gas discharge passage 20b through connection channels 28a, 28b.

A first seal member (rubber seal member) 32 is provided integrally with the surfaces 16a, 16b of the first metal separator 16, around the outer end of the first metal separator 16, e.g., by heating or injection molding. The first seal member 32 is made of seal material, cushion material, or packing material such as an EPDM rubber (Ethylene Propylene Diene Monomer), an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

The first seal member 32 includes a first planar portion 34 formed integrally with the surface 16a of the first metal separator 16 and a second planar portion 36 formed integrally with the surface 16b of the first metal separator 16. As shown in FIG. 4, the first planar portion 34 is formed around the oxygen-containing gas supply passage 20a, the oxygen-containing gas discharge passage 20b, and the oxygen-containing gas flow field 26 such that the oxygen-containing gas supply passage 20a and the oxygen-containing gas discharge passage 20b are connected to the oxygen-containing gas flow field 26. The second planar portion 36 is formed around the coolant supply passage 22a, the coolant discharge passage 22b, and a coolant flow field (described later) such that the coolant supply passage 22a and the coolant discharge passage 22b are connected to the coolant flow field.

Figure 5:
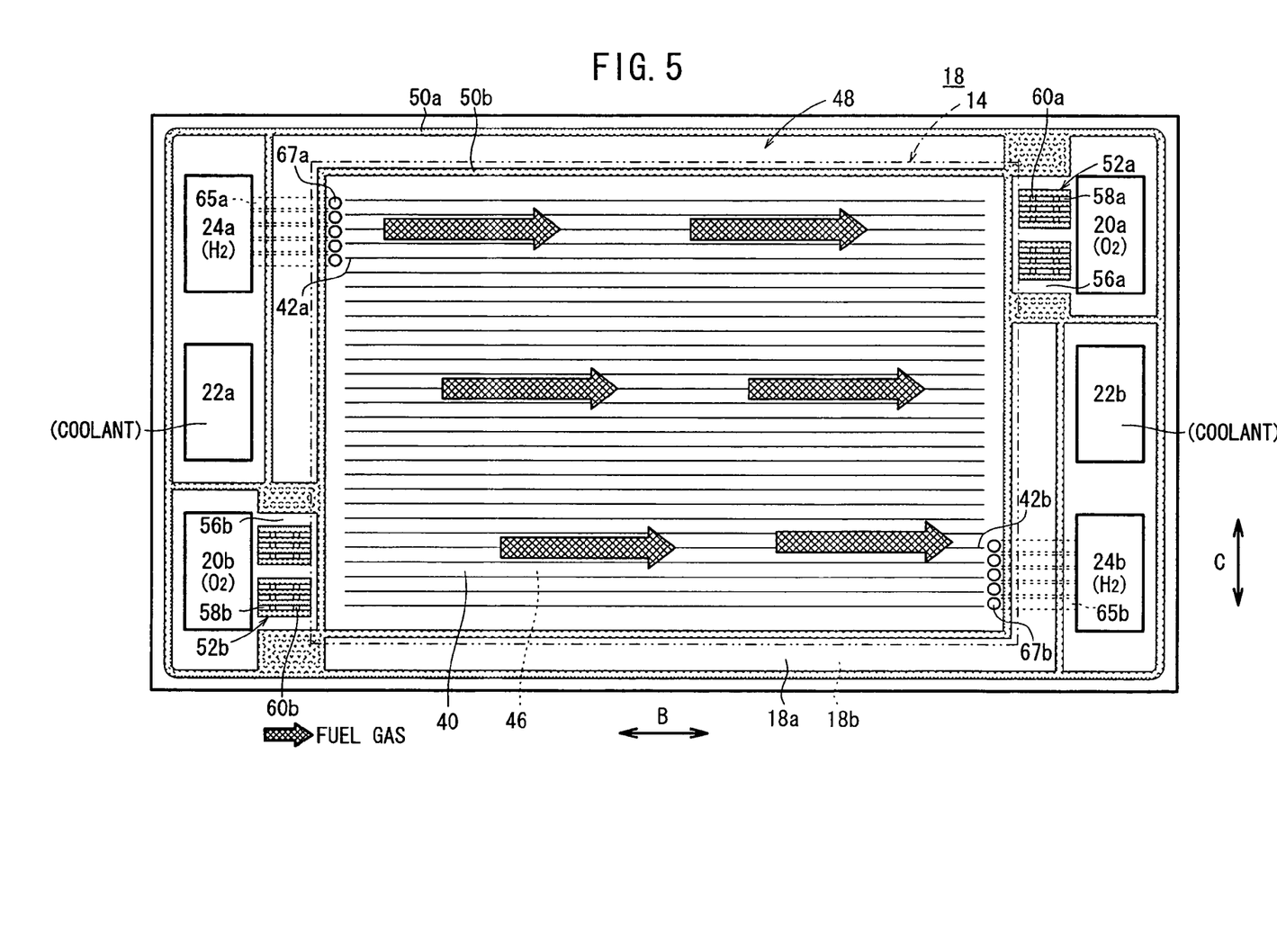
FIG. 5 is a front view showing one surface of a second metal separator of the fuel cell.

As shown in FIGS. 1 and 5, the second metal separator 18 has a fuel gas flow field (fluid flow field) 40 on a surface 18a facing the membrane electrode assembly 14. The fuel gas flow field 40 extends in the direction indicated by the arrow B. The fuel gas flow field 40 comprises a plurality of grooves. The fuel gas flow field 40 is connected to the fuel gas supply passage 24a and the fuel gas discharge passage 24b through connection channels 42a, 42b as described later.

As shown in FIG. 1, the second metal separator 18 has the coolant flow field (fluid flow field) 46 on a surface 18b opposite to the surface 18a. The coolant flow field 46 is connected to the coolant supply passage 22a and the coolant discharge passage 22b.

A second seal member (rubber seal member) 48 is provided integrally with the surfaces 18a, 18b of the second metal separator 18, around the outer end of the second metal separator 18. The second seal member 48 is made of material which is the same as material of the first seal member 32.

As shown in FIG. 5, the second seal member 48 includes an outer ridge seal 50a on the surface 18a of the second metal separator 18. The outer ridge seal 50a is provided near the outer end of the second metal separator 18. Further, the second seal member 48 includes an inner ridge seal 50b spaced inwardly from the outer ridge seal 50a by a predetermined distance. The inner ridge seal 50b is formed around the fuel gas flow field 40.

Figure 6:
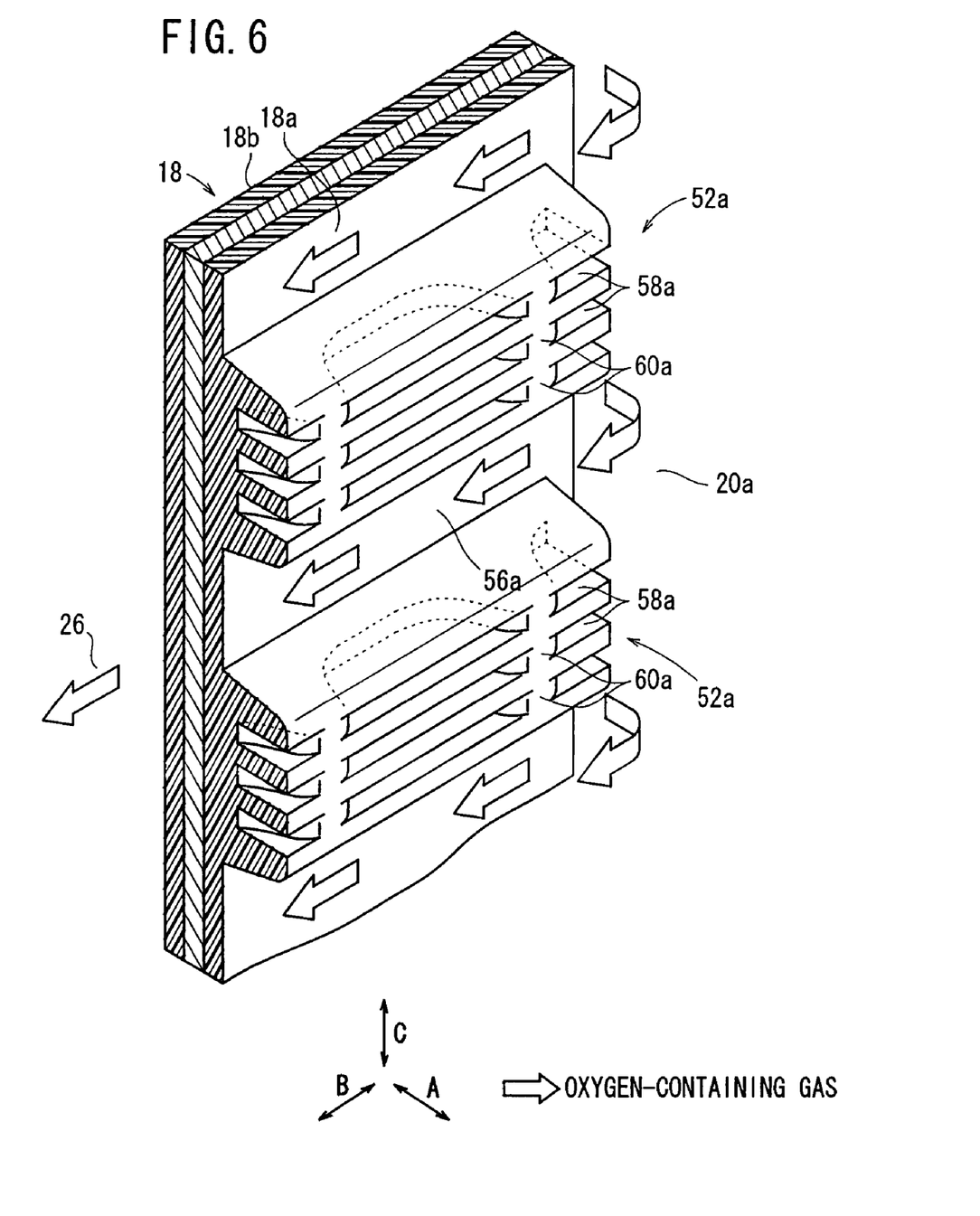
FIG. 6 is a perspective view schematically showing a rubber bridge of the fuel cell.

On the surface 18a, rubber bridges (rubber wall members) 52a, 52b are provided near the oxygen-containing gas supply passage 20a and the oxygen-containing gas discharge passage 20b, respectively. As shown in FIGS. 5 and 6, the rubber bridge 52a includes a plurality of channels 56a connecting the oxygen-containing gas supply passage 20a and the oxygen-containing gas flow field 26. In effect, the rubber bridge 52a is divided into two parts. A plurality of grooves 58a are formed between the channels 56a. The grooves 58a are narrower than the channels 56a. The rubber bridge 52a has a pair of partitions 60a for closing the grooves 58a at two positions to prevent the flow of the oxygen-containing gas.

The partitions 60a are formed integrally with the rubber bridge 52a on the second metal separator 18. The partitions 60 have a mountain shape protruding toward the open end of the grooves 58a. Preferably, the height of the partitions 60a is the same as, or higher than the height of the rubber bridge 52a in a compressed state. It is because the height of the rubber bridge 52a when no load is applied to the rubber bridge 52a is higher than the height of the rubber bridge 52a when the rubber bridge 52a is compressed in the stacking direction. Alternatively, the partitions 60a may be formed separately from rubber bridge 52a, and fixedly adhered to the rubber bridge 52a.

As shown in FIG. 5, likewise, the rubber bridge 52b includes a plurality of channels 56b connecting the oxygen-containing gas discharge passage 20b and the oxygen-containing gas flow field 26. A plurality of grooves 58b are provided between the channels 56b. The grooves 58b are narrower than the channels 56b. The rubber bridge 52b has a pair of partitions 60b for closing the grooves 58b at two positions to prevent the flow of the oxygen-containing gas.

Figure 7:
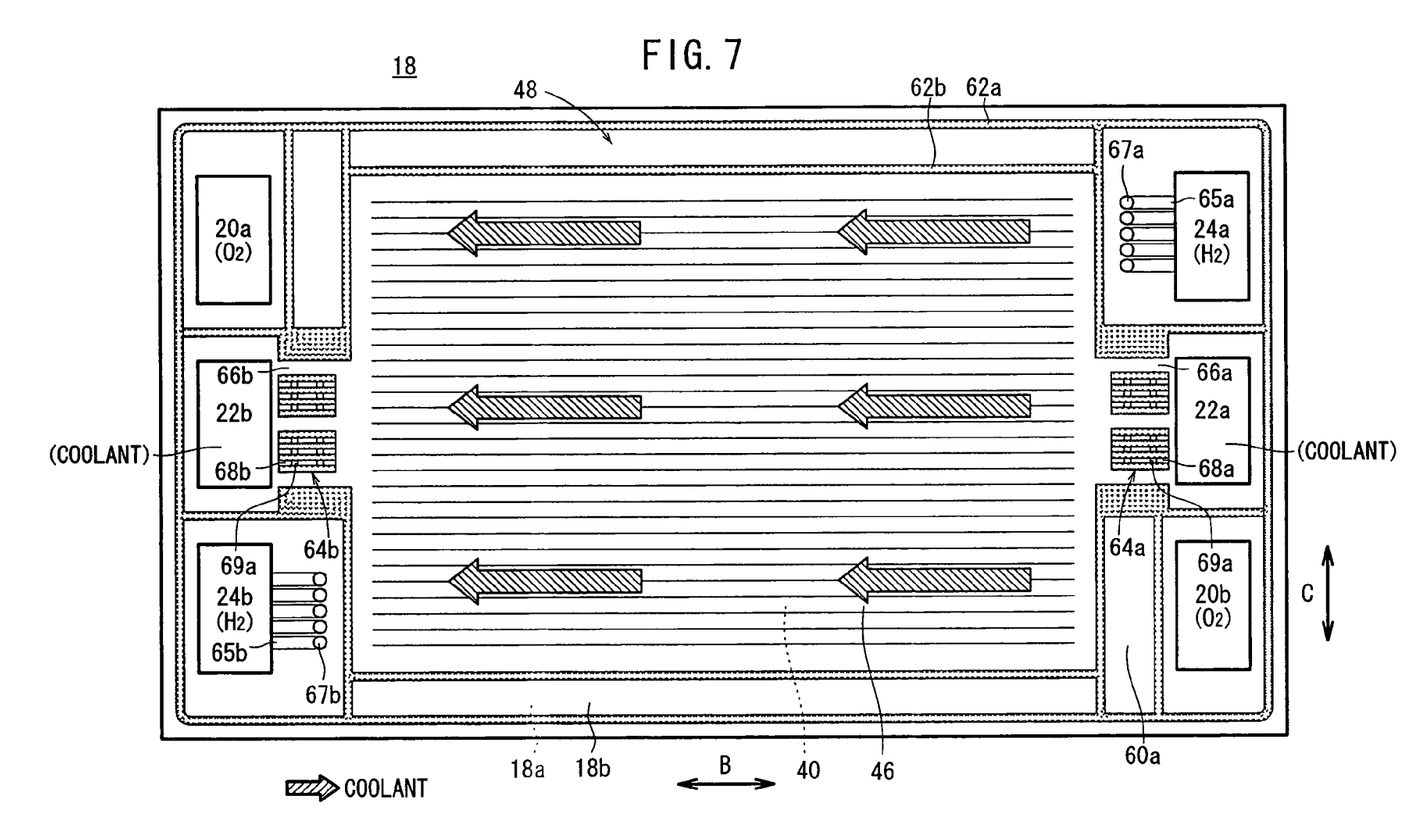
FIG. 7 is a view showing the other surface of the second separator.

As shown in FIG. 7, on the surface 18b of the second metal separator 18, the second seal member 48 includes an outer ridge seal 62a and an inner ridge seal 62b spaced inwardly from the outer ridge seal 62a. The inner ridge seal 62b is formed around the coolant flow field 46.

Rubber bridges (rubber wall members) 64a, 64b are provided near the coolant supply passage 22a and the coolant discharge passage 22b, respectively. The rubber bridge 64a includes a plurality of channels 66a connecting the coolant supply passage 22a and the coolant flow field 46. A plurality of grooves 68a are provided between the channels 66a. The grooves 68a are narrower than the channels 66a. The rubber bridge 64a has a pair of partitions 69a for closing the grooves 68a at two positions to prevent the flow of the coolant.

Likewise, the rubber bridge 64b includes a plurality of channels 66b connecting the coolant discharge passage 22b and the coolant flow field 46. A plurality of grooves 68b are provided between the channels 66b. The grooves 68b are narrower than the channels 66b. The rubber bridge 64b has a pair of partitions 69b for closing the grooves 68b at two positions to prevent the flow of the coolant.

As shown in FIGS. 2 and 3, on both surfaces 18a, 18b of the second metal separator 18, the rubber bridges 52a, 52b are overlapped with part of the outer ridge seal 62a (sealing ridge) in the stacking direction, and the rubber bridges 64a, 64b are overlapped with part of the outer ridge seal 50a (sealing ridge) in the stacking direction.

As shown in FIG. 7, a plurality of channels 65a, 65b are provided on the surfaces 18b of the second metal separator 18. The channels 65a are connected to the fuel gas supply passage 24a, and the channels 65b are connected to the fuel gas discharge passage 24b. Further, the channels 65a are connected to a plurality of holes 67a, and the channels 65b are connected to a plurality of holes 67b. The holes 67a, 67b are connected to the fuel gas flow field 40 on the surface 18a (see FIG. 5).

As shown in FIG. 1, the membrane electrode assembly 14 includes an anode 72, a cathode 74, and a solid polymer electrolyte membrane (electrolyte) 70 interposed between the anode 72 and the cathode 74. The solid polymer electrolyte membrane 70 is formed by impregnating a thin membrane of perfluorosulfonic acid with water, for example. In the membrane electrode assembly 14, the surface area of the anode 72 is smaller than the surface area of the cathode 74 and the surface area of the solid polymer electrolyte membrane 70.

Each of the anode 72 and the cathode 74 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 72 and the electrode catalyst layer of the cathode 74 are fixed to both surfaces of the solid polymer electrolyte membrane 70, respectively.

Next, operation of the fuel cell 10 will be described.

Firstly, as shown in FIG. 1, a fuel gas such as a hydrogen-containing gas is supplied to the fuel gas supply passage 24a, and an oxygen-containing gas is supplied to the oxygen-containing gas supply passage 20a. Further, pure water, an ethylene glycol, or oil is supplied to the coolant supply passages 22a.

Thus, as shown in FIG. 5, after the fuel gas flows through the channels 65a from the fuel gas supply passage 24a of the second metal separator 18, the fuel gas moves through the holes 67a toward the surface 18a, and flows into the fuel gas flow field 40. In the fuel gas flow field 40, the fuel gas flows along the direction indicated by the arrow B, and the fuel gas is supplied to the anode 72 of the electrolyte electrode assembly 14.

As shown in FIGS. 2 and 6, the oxygen-containing gas from the oxygen-containing gas supply passage 20a flows through the channels 56a of the rubber bridge 52a on the second metal separator 18, and flows into the oxygen-containing gas flow field 26 of the first metal separator 16. Thus, as shown in FIGS. 1 and 4, in the oxygen-containing gas flow field 26, the oxygen-containing gas flows in the direction indicated by the arrow B, and the oxygen-containing gas is supplied to the cathode 74 of the membrane electrode assembly 14.

Thus, in the membrane electrode assembly 14, the oxygen-containing gas supplied to the cathode 74 and the fuel gas supplied to the anode 72 are consumed in the electrochemical reactions at catalyst layers of the cathode 74 and the anode 72 for generating electricity.

Then, the fuel gas consumed at the anode 72 flows through the holes 67b to the channels 65b, and the fuel gas is discharged into the fuel gas discharge passage 24b in the direction indicated by the arrow A. Likewise, the oxygen-containing gas consumed at the cathode 74 flows through the channels 56b of the rubber bridge 52b, and the oxygen-containing gas is discharged into the oxygen-containing gas discharge passage 20b in the direction indicated by the arrow A.

Further, as shown in FIG. 7, the coolant supplied to the coolant supply passage 22a flows thorough the channels 66a of the rubber bridge 64a into the coolant flow field 46 between the first and second metal separators 16, 18. In the coolant flow field 46, the coolant flows in the direction indicated by the arrow B. After the coolant cools the membrane electrode assembly 14, the coolant flows through the channels 66b of the rubber bridge 64b, and is discharged into the coolant discharge passage 22b.

In the first embodiment, as shown in FIGS. 5 and 6, one or more channels 56a connecting the oxygen-containing gas supply passage 20a and the oxygen-containing gas flow field 26 are formed in the rubber bridge 52a dividing the oxygen-containing gas supply passage 20a and the oxygen-containing gas flow field 26.

Further, the narrow grooves 58a are formed between the channels 56a, and the rubber bridge 52a having a relatively large size is divided into a plurality of parts. The compression load characteristic of the rubber bridge 52a is lowered, and it is possible to increase the elasticity of the rubber bridge 52a effectively.

Thus, when the fuel cells 10 are tightened in the stacking direction, and a tightening load is applied to the rubber bridge 52a and part of the outer ridge seal 62a overlapped with each other in the stacking direction, the compressibility of the rubber bridge 52a becomes close to the compressibility of part of the outer ridge seal 62a.

Thus, it is possible to avoid a situation in which the compressibility of the narrow outer ridge seal 62a becomes high to cause significant deterioration in the rigidity of the outer ridge seal 62a and the wide rubber bridge 52a with low compressibility cannot maintain the line pressure required for sealing. In the present invention, it is possible to maintain the desired line pressures for the rubber bridge 52a and the outer ridge seal 62a for sealing. Accordingly, it is possible to desirably prevent leakages of the oxygen-containing gas, the fuel gas, and the coolant.

Further, the rubber bridge 52a has the partitions 60a for closing the grooves 58a to prevent the flow of the oxygen-containing gas. Since the oxygen-containing gas only flows through the channels 56a, it is possible to maintain the desired flow rate of the oxygen-containing gas supplied to the oxygen-containing gas flow field 26, and achieve the desired power generation performance. In the rubber bridge 52b, the same advantages as in the case of the rubber bridge 52a can be obtained.

As shown in FIG. 7, one or more channels 66a connecting the coolant supply passage 22a and the coolant flow field 46 are formed in the rubber bridge 64a dividing the coolant supply passage 22a and the coolant flow field 46. Further, the grooves 68a each closed by the pair of partitions 69a are formed between the channels 66a. The rubber bridge 64a having a relative large size is divided into a plurality of parts, and the compressibility of the rubber bridge 64a is increased.

In the rubber bridge 64a and the outer ridge seal 50a overlapped with each other in the stacking direction, the compressibility of the rubber bridge 64a is adjusted to be close to the compressibility of the outer ridge seal 50a. Thus, the same advantages as in the case of the rubber bridge 52a can be obtained. For example, it is possible to prevent the leakage of the coolant in the rubber bridge 64a, and the leakage of the fuel gas in the outer ridge seal 50a. Further, in the rubber bridge 64b dividing the coolant discharge passage 22b and the coolant flow field 46, the same advantages as in the case of the rubber bridge 64a can be obtained.

Further, in the first embodiment, the rubber bridges 52a, 52b, 64a, 64b, and the second seal member 48 are formed integrally with the surfaces 18a, 18b of the second metal separator 18 at the same time. The partitions 60a, 60b, 69a, 69b are formed integrally with the rubber bridges 52a, 52b, 64a, 64b. Thus, the seal forming process is simplified greatly, and productivity of the second metal separator 18 is improved effectively.

In the first embodiment, the outer ridge seal 50a, the inner ridge seal 50b, the outer ridge seal 62a, and the inner ridge seal 62b are provided on the surfaces 18a, 18b of the second metal separator 18. However, the present invention is not limited in this respect. For example, alternatively, the inner ridge seal 62b may be formed integrally with the rubber bridges 64a, 64b, and only the outer ridge seal 50a may be formed on the surface 18a of the second metal separator 18. Also in second to fourth embodiments, the present invention is not limited to the above specific structure described in connection with the first embodiment, and various modifications can be adopted.

Figure 8:
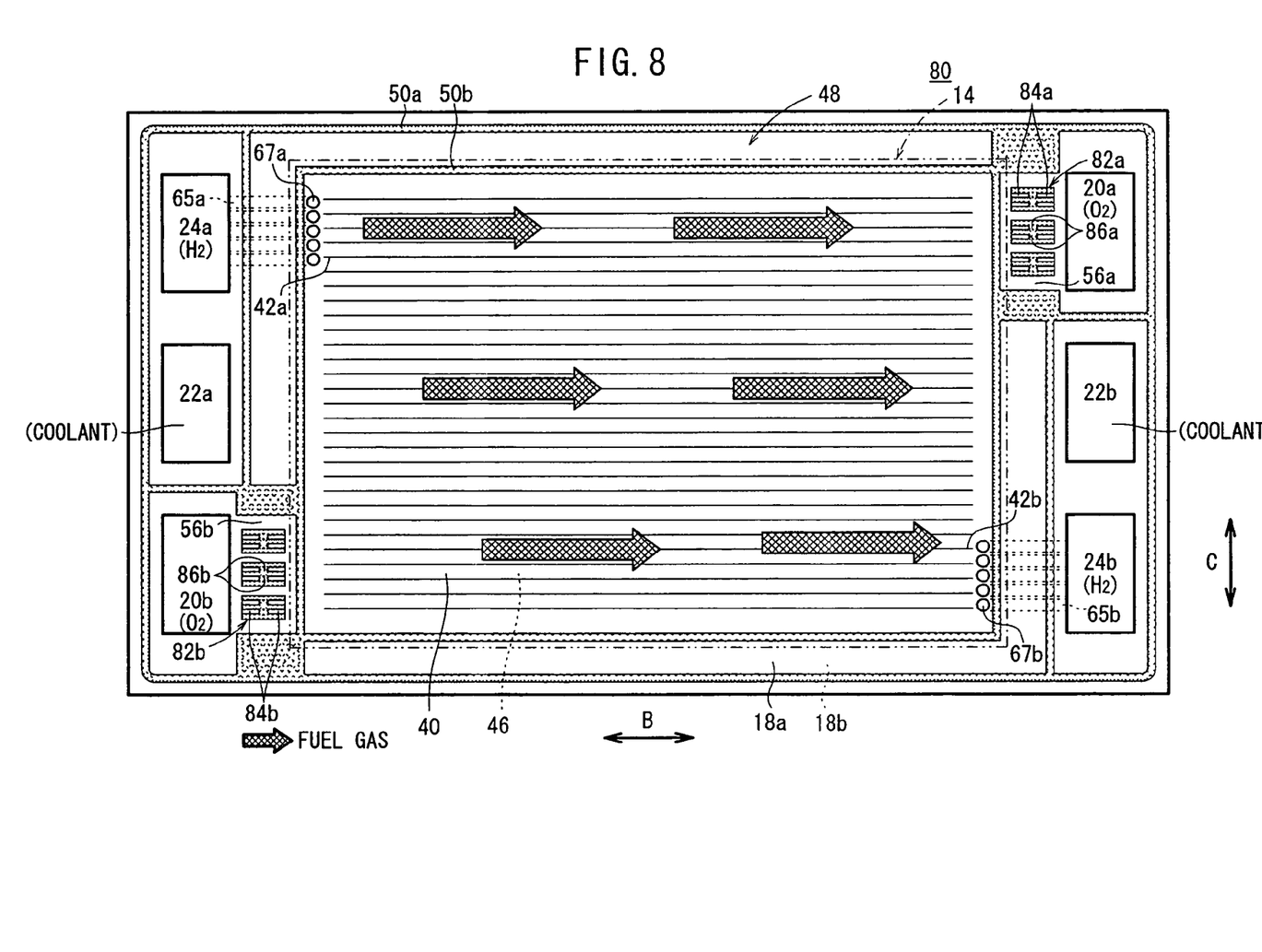
FIG. 8 is a view showing one surface of a second metal separator of a fuel cell according to a second embodiment of the present invention.

FIG. 8 is a view showing one surface 18a of a second metal separator 80 of a fuel cell according to a second embodiment of the present invention. The constituent elements that are identical to those of the second metal separator 18 of the fuel cell 10 according to the first embodiment are labeled with the same reference numeral, and description thereof will be omitted. Further, also in third and fourth embodiments as descried later, the constituent elements that are identical to those of the second metal separator 18 of the fuel cell 10 according to the first embodiment are labeled with the same reference numeral, and description thereof will be omitted.

Figure 9:
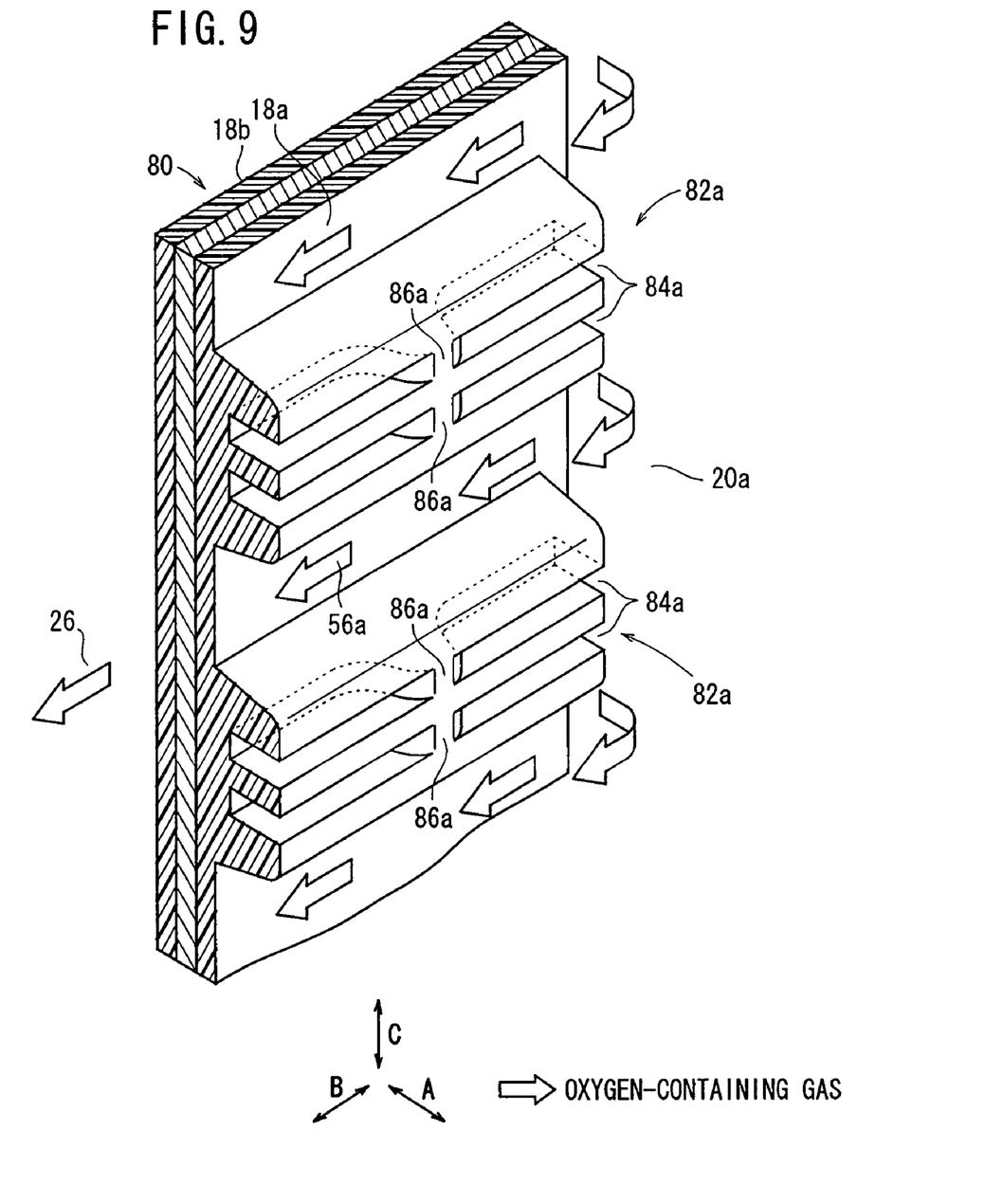
FIG. 9 is a perspective view schematically showing a rubber bridge of the fuel cell.

Rubber bridges (rubber wall members) 82a, 82b are provided near the oxygen-containing gas supply passage 20a and the oxygen-containing gas discharge passage 20b, respectively. In effect, the rubber bridge 82a is divided into three parts by a plurality of channels 56a. As shown in FIGS. 8 and 9, a plurality of grooves 84a are formed between the channels 56a. The grooves 84a are narrower than the channels 56a. The rubber bridge 82a has a partition 86a for closing the grooves 84a at one position to prevent the flow of the oxygen-containing gas.

In effect, the rubber bridge 82b is divided into three parts by a plurality of channels 56b. A plurality of grooves 84b are formed between the channels 56b. The grooves 84b are narrower than the channels 56b. The rubber bridge 82b has a partition 86b for closing the grooves 84b at one position to prevent the flow of the oxygen-containing gas.

Though not shown, the rubber bridges 82a, 82b are provided on the surface 18b of the second metal separator 90 instead of the rubber bridges 64a, 64b.

Figure 10:
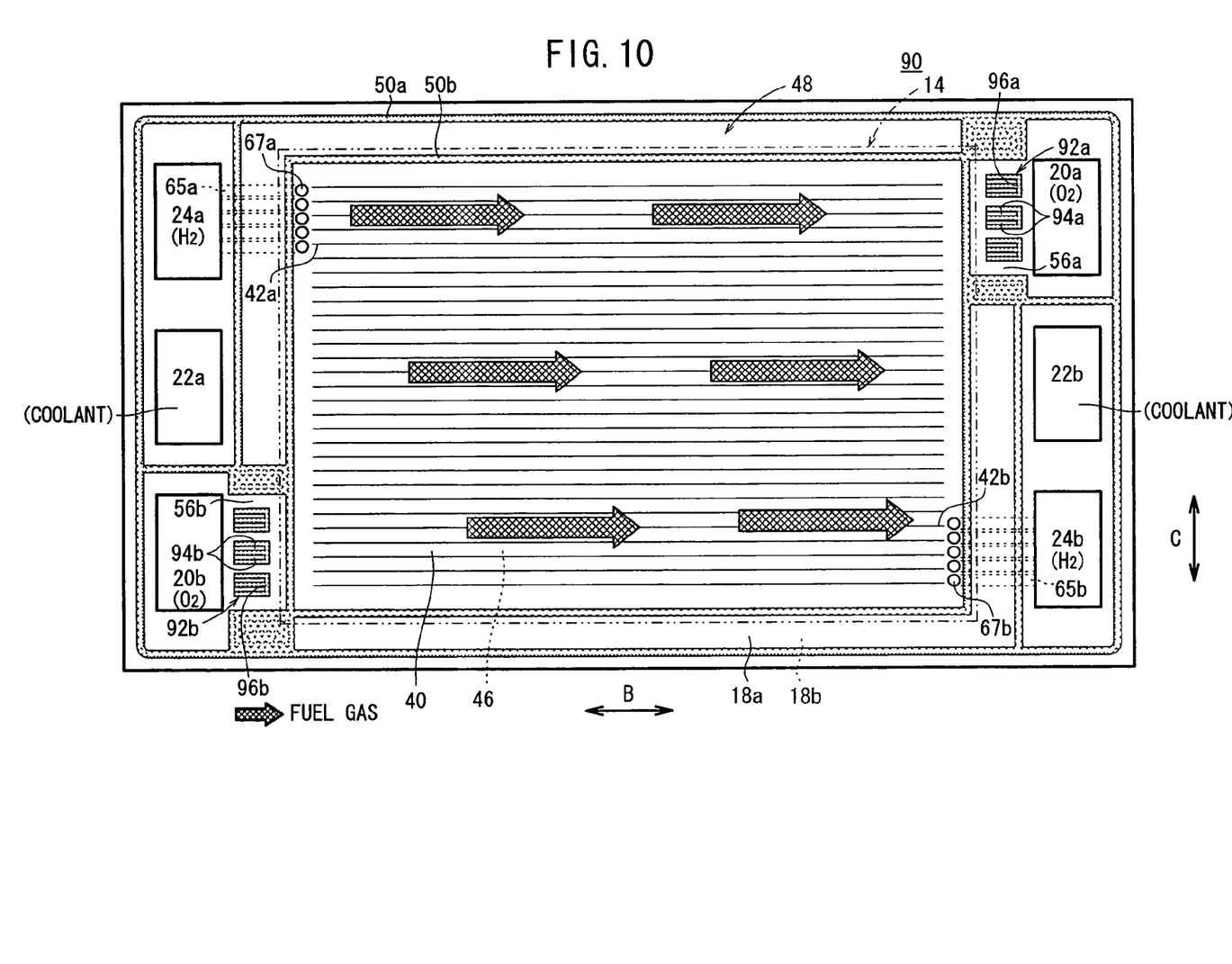
FIG. 10 is a view showing one surface of a second metal separator of a fuel cell according to a third embodiment of the present invention.

FIG. 10 is a view showing one surface 18a of a second metal separator 90 of a fuel cell according to a third embodiment of the present invention.

Figure 11:
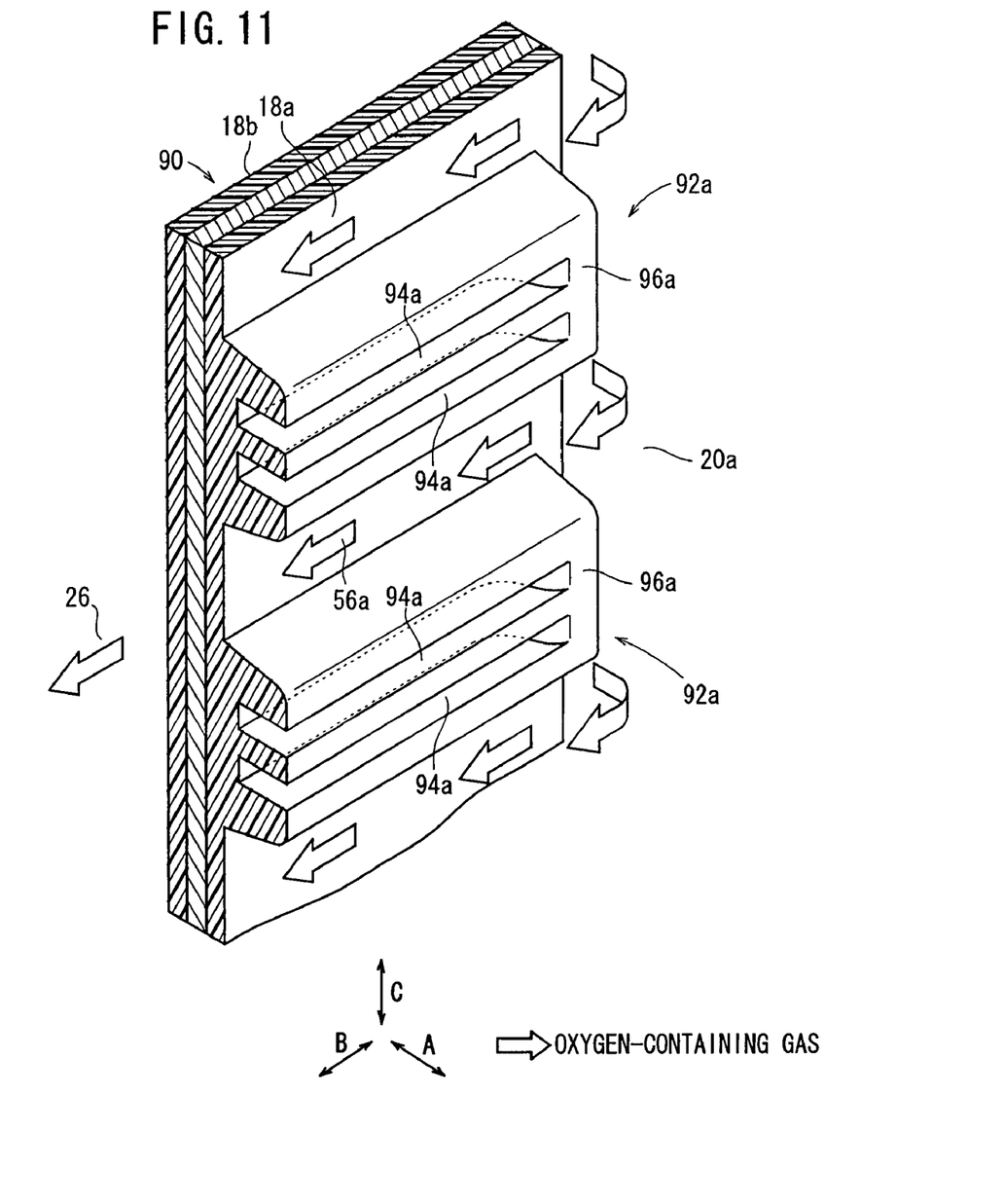
FIG. 11 is a perspective view schematically showing a rubber bridge of the fuel cell.

Rubber bridges (rubber wall members) 92a, 92b are provided near the oxygen-containing gas supply passage 20a and the oxygen-containing gas discharge passage 20b, respectively. In effect, the rubber bridges 92a, 92b are divided into three parts by a plurality of channels 56a, 56b. A plurality of grooves 94a, 94b are formed between the channels 56a, 56b. The grooves 94a, 94b are narrower than the channels 56a, 56b. Partitions 96a, 96b are provided in the rubber bridges 92a, 92b for closing the grooves 94a, 94b at one upstream end in the fluid flow direction to prevent the flow of the oxygen-containing gas (see FIGS. 10 and 11).

Though not shown, the rubber bridges 92a, 92b are provided on the surface 18b of the second metal separator 90 instead of the rubber bridges 64a, 64b.

Figure 12:
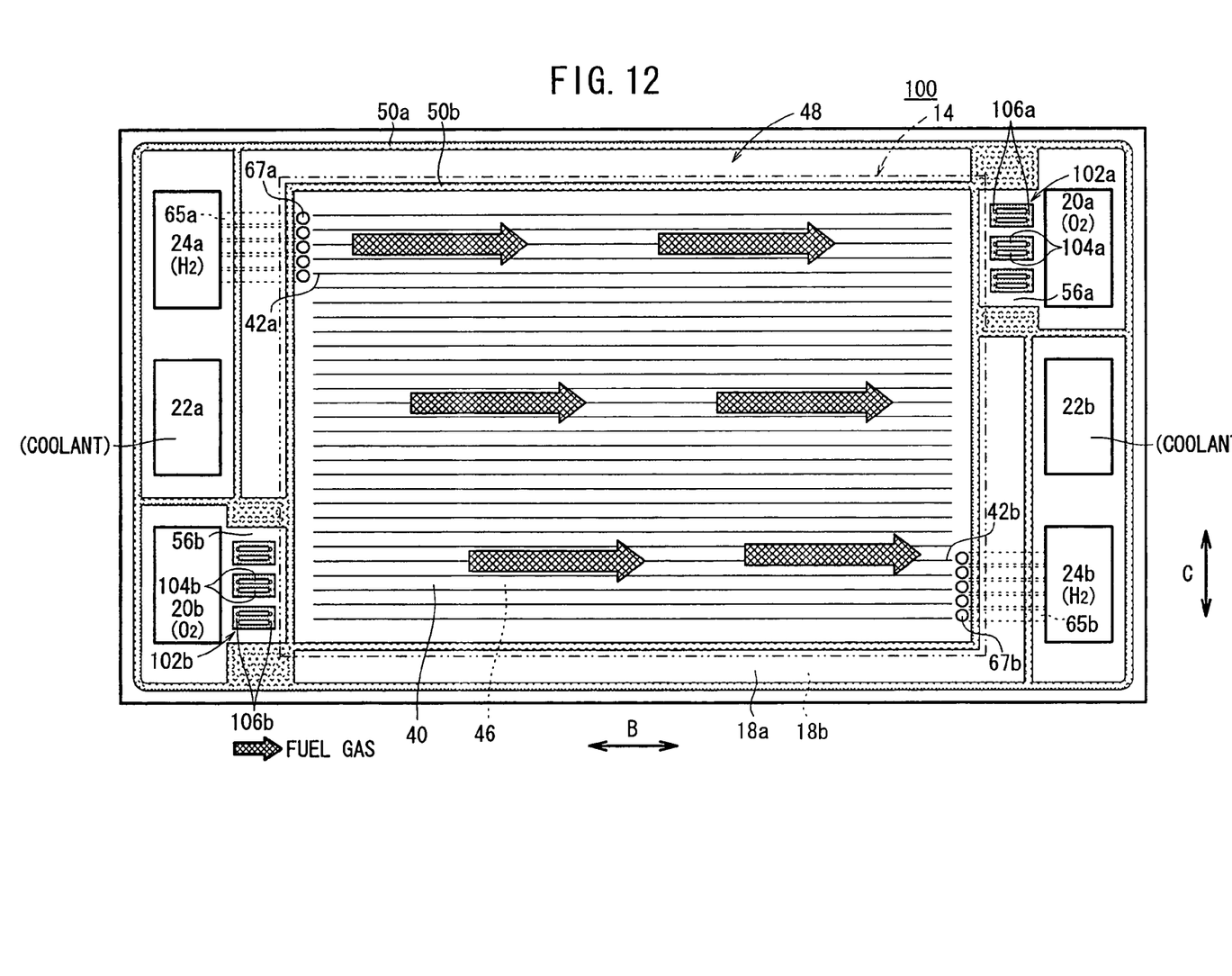
FIG. 12 is a view showing one surface of a second metal separator of a fuel cell according to a fourth embodiment of the present invention.

FIG. 12 is a view showing one surface 18a of a second metal separator 100 of a fuel cell according to a fourth embodiment of the present invention.

Figure 13:
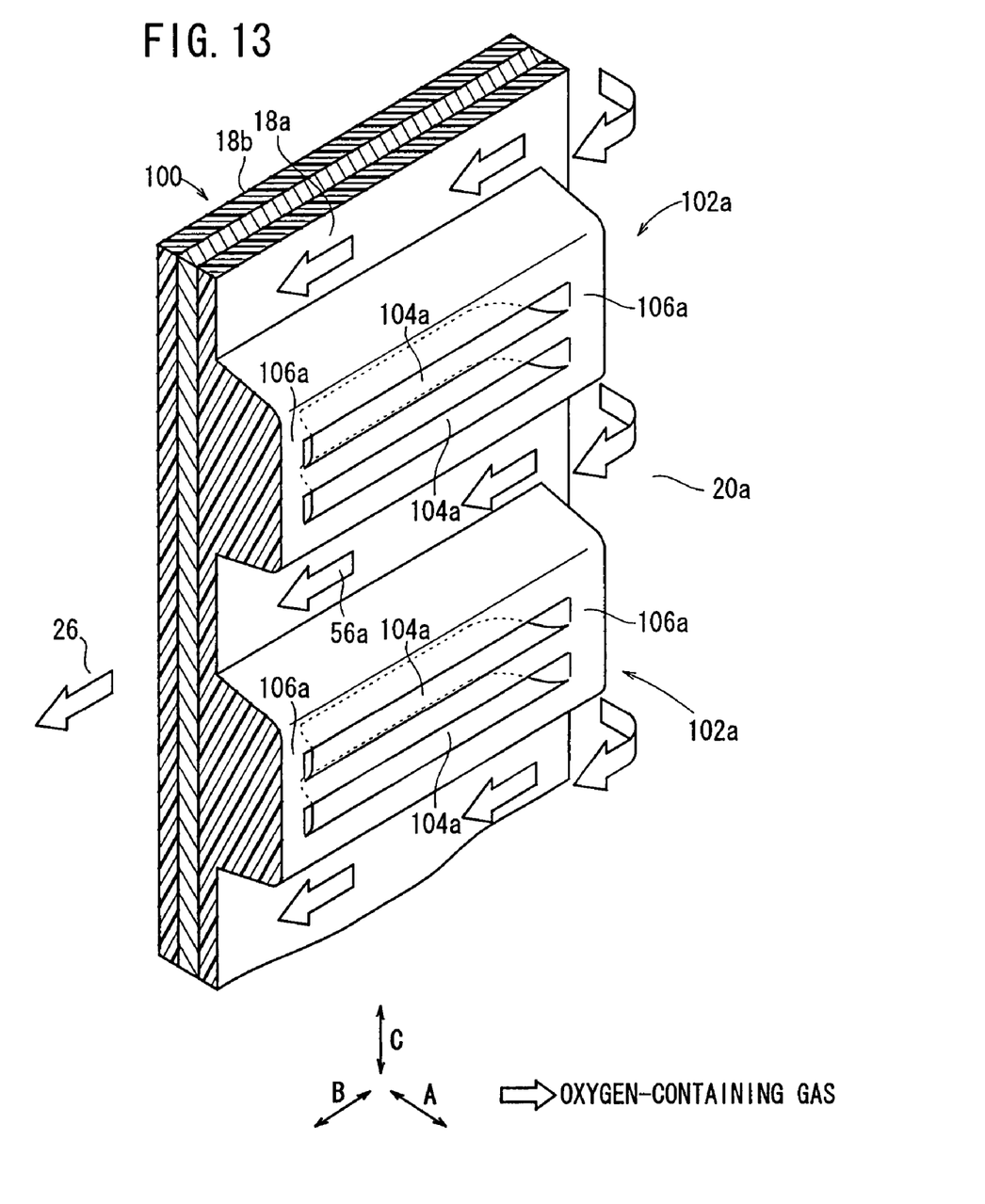
FIG. 13 is a perspective view schematically showing a rubber bridge of the fuel cell.

Rubber bridges (rubber wall members) 102a, 102 are formed on the surface 18a of the second metal separator 100 near the oxygen-containing gas supply passage 20a and the oxygen-containing gas discharge passage 20b, respectively. In effect, the bridges 102a, 102b are divided into three parts by a plurality of channels 56a, 56b. A plurality of grooves 104a, 104b are formed between the channels 56a, 56b. The grooves 104a, 104b are narrower than the channels 56a, 56b. A pair of partitions 106a, 106b are provided in the rubber bridges 102a, 102b. The partitions 106a 106b close the grooves 104*a*, 104*b* at both ends in the fluid flow direction to prevent the flow of the oxygen-containing gas (see FIGS. 12 and 13).

Though not shown, the rubber bridges 102*a*, 102*b* are provided on the surface 18*b* of the second metal separator 100 instead of the rubber bridges 64*a*, 64*b*.

In the second to fourth embodiments, the channels 56*a*, 56*b*, and the grooves 84*a*, 84*b*, 94*a*, 94*b*, 104*a*, 104*b* narrower than the channels 56*a*, 56*b* are provided, and the same advantages as in the case of the first embodiment can be obtained.

Further, in the fourth embodiment, the partitions 106*a*, 106*b* are provided to close the grooves 104*a*, 104*b* at both ends. The grooves 104*a*, 104*b* are sealed from the channels 56*a*, 56*b*. Thus, it is possible to suitably prevent the entry of water into the grooves 104*a*, 104*b*.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell formed by stacking an electrolyte electrode assembly and a metal separator in a stacking direction, said electrolyte electrode assembly including a pair of electrodes and an electrolyte interposed between said electrodes, a fluid flow field for supplying a fluid comprising at least one of a fuel gas, an oxygen-containing gas, and a coolant along a surface of said metal separator, and a fluid passage for supplying the fluid in the stacking direction, being formed in said fuel cell, said fuel cell comprising:

a rubber wall member provided on said metal separator, said rubber wall member disposed between said fluid flow field and said fluid passage to divide said fluid flow field and said fluid passage;

said rubber wall member having:

a channel disposed between said fluid flow field and said fluid passage to allow flow of said fluid between said fluid flow field and said fluid passage;

one or more grooves formed by a cutout in the stacking direction, said one or more grooves disposed adjacent to said channel and extending along said channel; and one or more partitions disposed within each of said one or more grooves, said one or more partitions closing at least part of each of said one or more grooves to prevent flow of said fluid between said fluid flow field and said fluid passage.

2. A fuel cell according to claim 1, wherein said rubber wall member is provided on one surface of said metal separator, and a sealing ridge is provided on the other surface opposite to the surface of said metal separator; and said sealing ridge and said rubber wall member are overlapped with each other in the stacking direction.

3. A fuel cell according to claim 1, wherein said partition is formed integrally with said rubber wall member.

4. A fuel cell according to claim 1, wherein said metal separator has a rubber seal member formed integrally with said rubber wall member for preventing leakage of said fluid.

5. A fuel cell according to claim 1, wherein said rubber wall member has a partition for closing said groove at an upstream end in a flow direction of the fluid to prevent flow of the fluid.

6. A fuel cell according to claim 1, wherein said rubber wall member has partitions for closing said groove at both ends in a flow direction of the fluid to prevent flow of the fluid.

7. A fuel cell according to claim 1, wherein:

said rubber wall member has a second channel disposed between said fluid flow field and said fluid passage to allow flow of said fluid between said fluid flow field and said fluid passage, said second channel extending along said channel; and said one or more grooves are disposed between and extend along said channel and said second channel.

* * * * *